United States Patent
Kosugi et al.

(10) Patent No.: US 6,923,398 B2
(45) Date of Patent: Aug. 2, 2005

(54) MECHANISM FOR WINDING SHEET MATERIAL

(75) Inventors: Akio Kosugi, Tokyo (JP); Yuichi Shirase, Aichi (JP); Tohru Sambommatsu, Aichi (JP)

(73) Assignee: Nifco Inc., Kanagawa (JP)

( * ) Notice: Subject to any disclaimer, the term of this patent is extended or adjusted under 35 U.S.C. 154(b) by 35 days.

(21) Appl. No.: 10/657,967

(22) Filed: Sep. 9, 2003

(65) Prior Publication Data

US 2004/0135022 A1 Jul. 15, 2004

(30) Foreign Application Priority Data

Jan. 15, 2003 (JP) ........................................ 2003-006548

(51) Int. Cl.$^7$ ............................................. B65H 75/30
(52) U.S. Cl. ...................... 242/396; 242/381; 160/296
(58) Field of Search ................................ 242/381, 396, 242/396.5, 396.6; 160/296, 305

(56) References Cited

U.S. PATENT DOCUMENTS 2,443,763 A * 6/1948 Dahlgren et al. ........ 242/390.2
4,222,601 A * 9/1980 White et al. ............. 296/37.16
6,663,038 B2 * 12/2003 Juchem et al. ............ 242/381
6,749,142 B2 * 6/2004 Arisaka et al. ............ 242/381

FOREIGN PATENT DOCUMENTS

JP          59-185148          8/1984

* cited by examiner

Primary Examiner—John M. Jillions
Assistant Examiner—Sang Kim
(74) Attorney, Agent, or Firm—Hogan & Hartson, LLP

(57) ABSTRACT

A winding mechanism retains a sheet material in a state in which the sheet material can be pulled out. The winding mechanism includes a flexible sheet material, a winding shaft attached to one end of the sheet material, a force application device that always applies a force to the winding shaft in a normal direction in which the sheet material is wound around the winding shaft, and a braking device that applies a braking force to the winding shaft only in the normal direction. In other words, the winding mechanism applies an appropriate braking force to the winding shaft when the sheet material is wound, but does not apply a braking force to the winding shaft when the sheet material is pulled out.

24 Claims, 9 Drawing Sheets

MECHANISM FOR WINDING SHEET MATERIAL

BACKGROUND OF THE INVENTION

1. Field of the Invention

The present invention relates to improvements in a winding mechanism that retains a flexible sheet material in a state in which the sheet material can be pulled out.

2. Related Background Art

A tonneau cover device may be typically attached to a vehicle such as a van or a truck having a cargo space. The tonneau cover device includes a tonneau cover that is typically made of a flexible sheet material and a winding mechanism that can wind the tonneau cover around a winding shaft in a cover storage box. The tonneau cover that is wound around the winding shaft can be pulled out from the cover storage box when it is required to cover the cargo space. The tonneau cover device is provided with a braking device inside the cover storage box to control movements of the tonneau cover when the tonneau cover is wound. The braking device is typically provided with a spring member that flexibly contacts the tonneau cover to apply a braking force to the tonneau cover. However, in the conventional structure, the braking device applies a braking force to the tonneau cover not only when the tonneau cover is wound but also when it is pulled out. Another braking device applies a braking force to the tonneau cover when the tonneau cover is wound and in an initial stage of a pull-out operation in which the tonneau cover is pulled out from the cover storage box. With such a braking structure, the resistance to the pull-out operation may be reduced, but the tonneau cover cannot be pulled out stably due to the braking force applied in the initial stage of pull-out operation. Furthermore, the braking force applied to the winding shaft is apt to change according to the amount of the tonneau cover that is wound (or pulled out), which makes it particularly difficult to control the winding speed at constant.

SUMMARY OF THE INVENTION

The present invention relates to a winding mechanism that retains a flexible sheet material in a state in which the sheet material can be pulled out, and more particularly to a winding mechanism that applies a constant braking force to a winding shaft when the sheet material is wound, but does not apply a braking force to the winding shaft when the sheet material is pulled out such that the sheet material can be pulled out without much resistance.

In accordance with an embodiment of the present invention, a winding mechanism includes a sheet material, a winding shaft attached to one end of the sheet material, a force application device that always applies a force to the winding shaft in a normal direction in which the sheet material is wound around the winding shaft, and a braking device that applies a braking force to the winding shaft only in the normal direction.

As a result, the winding shaft can be rotated with few resistance in a reverse direction in which the winding shaft is rotated in a reverse direction when the sheet material is pulled out in a pull-out operation, and the pull-out operation can be smoothly conducted. On the other hand, when rotation of the winding shaft in the normal direction is allowed, for example, when a grip or a temporary fixed state at the other end of the sheet material that has been pulled out is released, the force application device automatically starts rotation of the winding shaft in the normal direction to wind the sheet material, and the braking device attenuates the force that is generated when the sheet material is wound, thereby preventing various members composing the winding mechanism from severely colliding one another or being damaged. As a result, the sheet material can be smoothly wound by the winding mechanism.

In one aspect of the present embodiment, the braking device may include an inner revolution member that is attached to the winding shaft and rotatable in unison with rotations of the winding shaft, an outer revolution member that is rotatable and stores the inner revolution member therein, a case member that stores the outer revolution member, planetary gear members that are stored in concave sections of the inner revolution member that recede toward a center of rotation, wherein the outer revolution member defines an inner wall section that is provided with an arcuate rack section that engages the planetary gear members, and a viscous fluid that fills a gap formed between the outer revolution member and the case member, wherein rotations of the planetary gears are restricted when the winding shaft rotates in a normal direction that rotate the inner revolution member in the normal direction.

In accordance with the structure described above, when the winding shaft rotates in a reverse direction opposite to the normal direction, the inner revolution member that is rotatable inside the outer revolution member is rotated in the reverse direction. In rotations in the reverse direction, the inner revolution member pushes the planetary gears and allows the planetary gears to rotate and run along the arcuate rack section of the outer revolution member such that the outer revolution member is not rotated by the rotation of the inner revolution member. Since the viscous fluid is filled in the gap between the outer revolution member and the case member and the outer revolution member does not rotate, the viscous fluid does not brake rotations of the inner revolution member in the reverse direction, and therefore does not brake rotations of the winding shaft in the reverse direction. In other words, the winding mechanism of the present invention can securely create a state in which no resistance is generated against an operation of pulling out a sheet material.

On the other hand, when the winding shaft rotates in the normal direction, the inner revolution member that is rotatable inside the outer revolution member is rotated by the outer revolution member in the normal direction. In rotations in the normal direction, the inner revolution member pushes the planetary gears and restricts rotations of the planetary gears. When the rotation of the planetary gears is restricted, the outer revolution member can also be rotated by the rotation of the inner revolution member in the normal direction through the planetary gears that engage the arcuate rack section of the outer revolution member. When the outer revolution member is rotated, the viscous fluid brakes rotations in the normal direction of the outer revolution member and therefore the inner revolution member within the outer revolution member, and therefore brakes rotations of the winding shaft in the normal direction. In other words, the winding mechanism of the present invention can securely create a state in which resistance is generated against an automatic winding operation of the force application device that automatically winds the sheet material that has been pulled out.

Also, in one aspect of the present invention, the braking device may be provided at each of two end sections of the winding shaft of the winding mechanism.

With the winding mechanism having the structure described above, braking force can be generated by the braking devices at both of the end sections of the winding shaft when the winding shaft rotates in the normal direction. As a result, rotations of the winding shaft in the normal direction can be stabilized, and therefore rotations of the winding shaft in the normal direction can be more appropriately braked.

Other features and advantages of the invention will be apparent from the following detailed description, taken in conjunction with the accompanying drawings that illustrate, by way of example, various features of embodiments of the invention.

PREFERRED EMBODIMENTS OF THE PRESENT INVENTION

A typical embodiment of the present invention is described below with reference to FIGS. 1 through 9.

Figure 1:
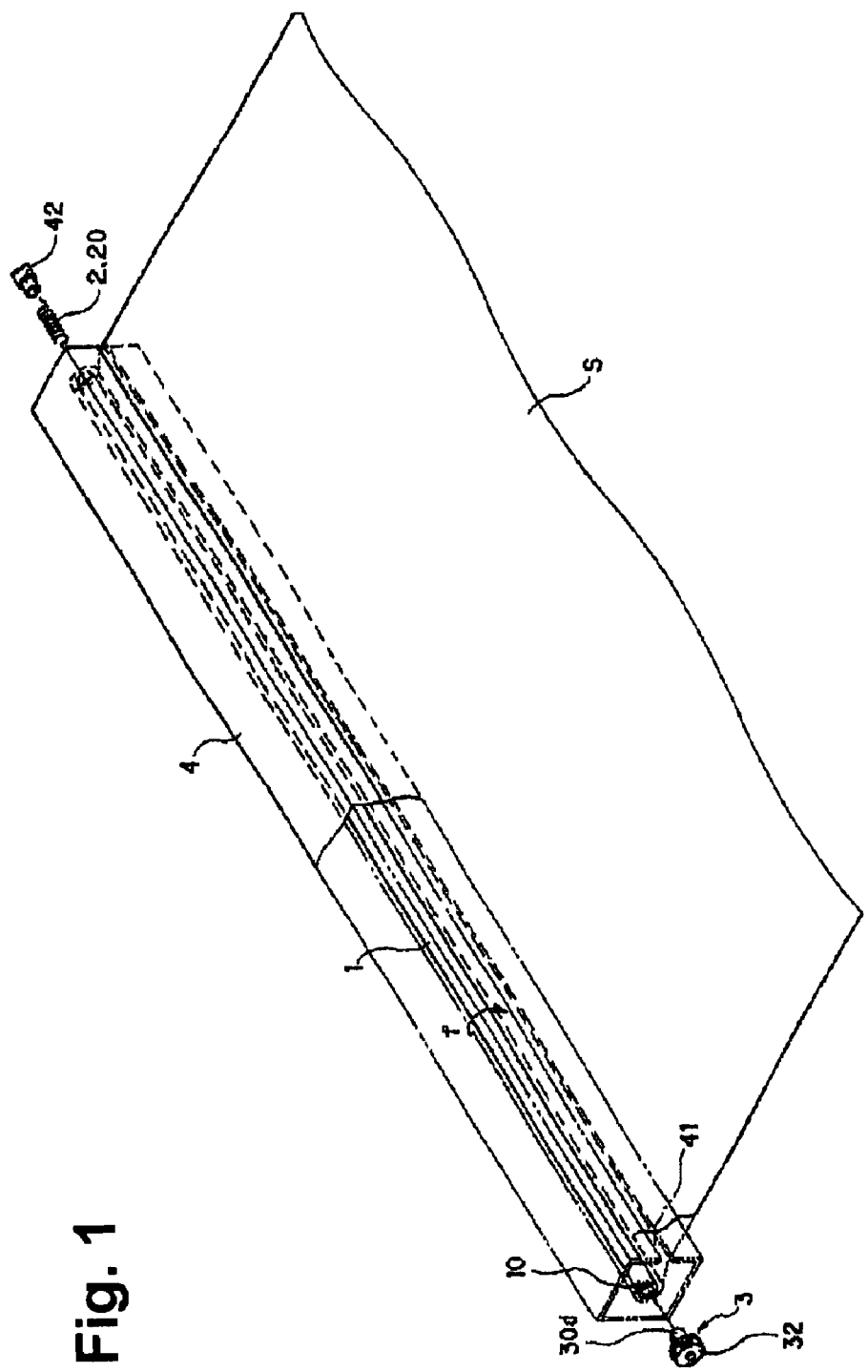
FIG. 1 shows a perspective view of a general structure of a winding mechanism.
Figure 2:
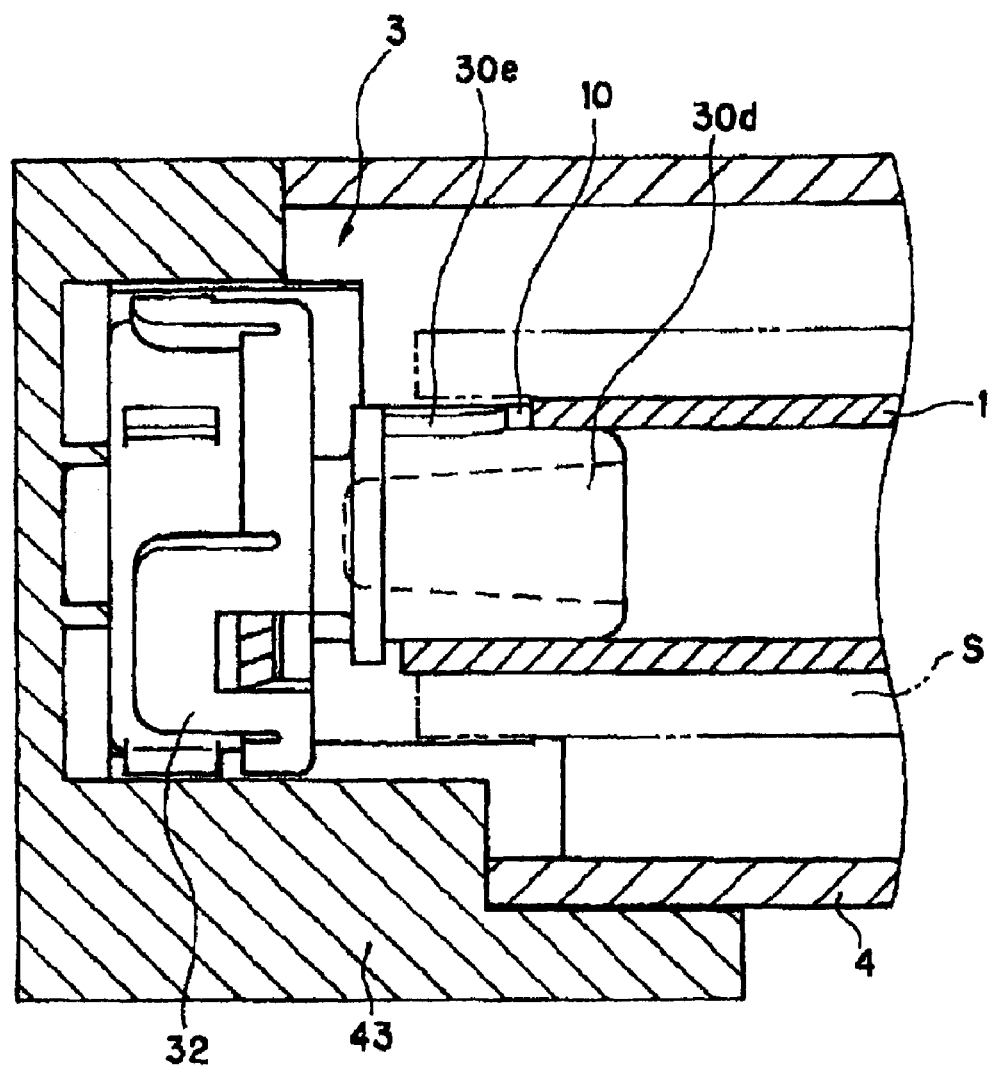
FIG. 2 shows a cross-sectional view of a braking device that composes the winding mechanism.
Figure 3:
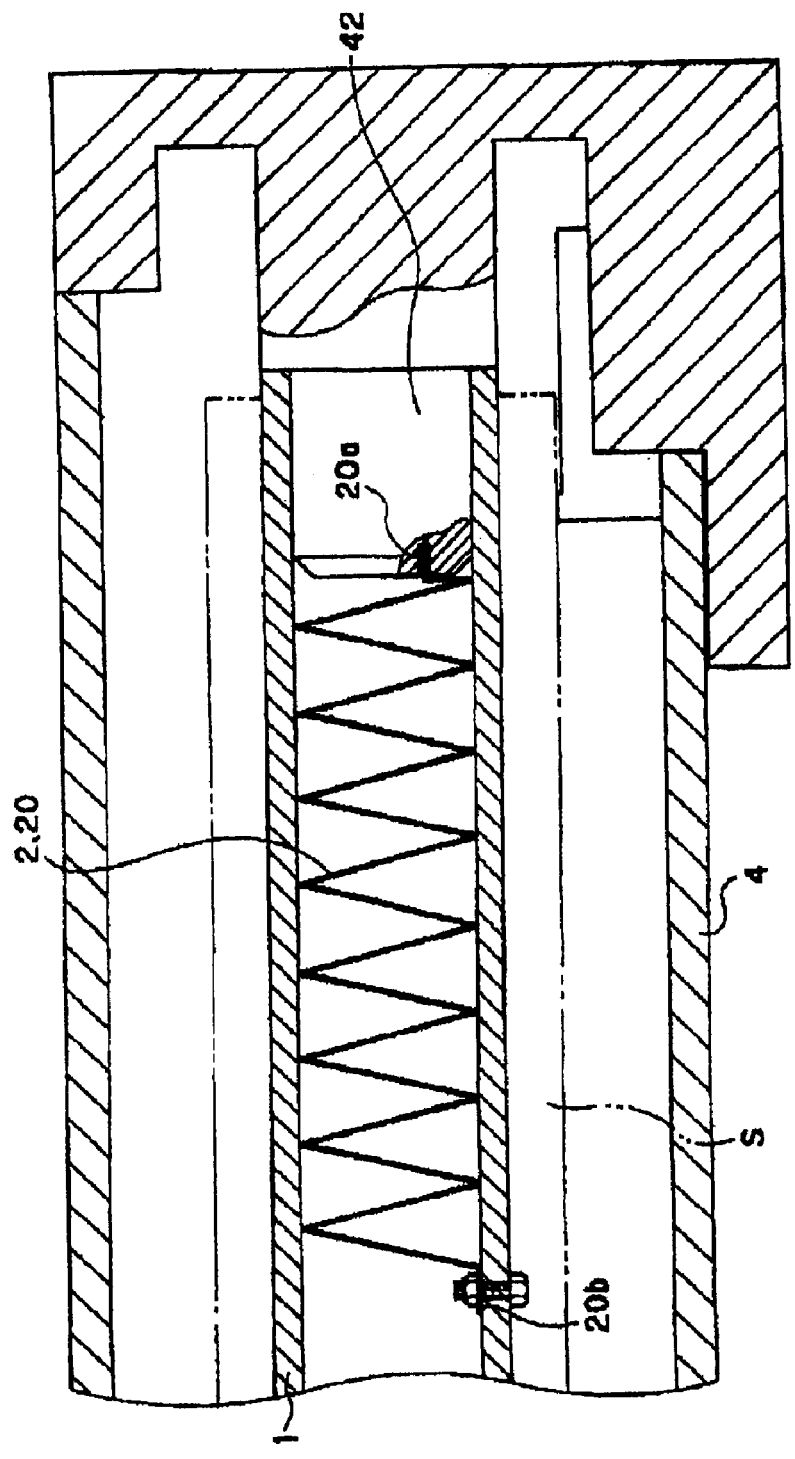
FIG. 3 shows a cross-sectional view of a force application device that composes the winding mechanism.
Figure 4:
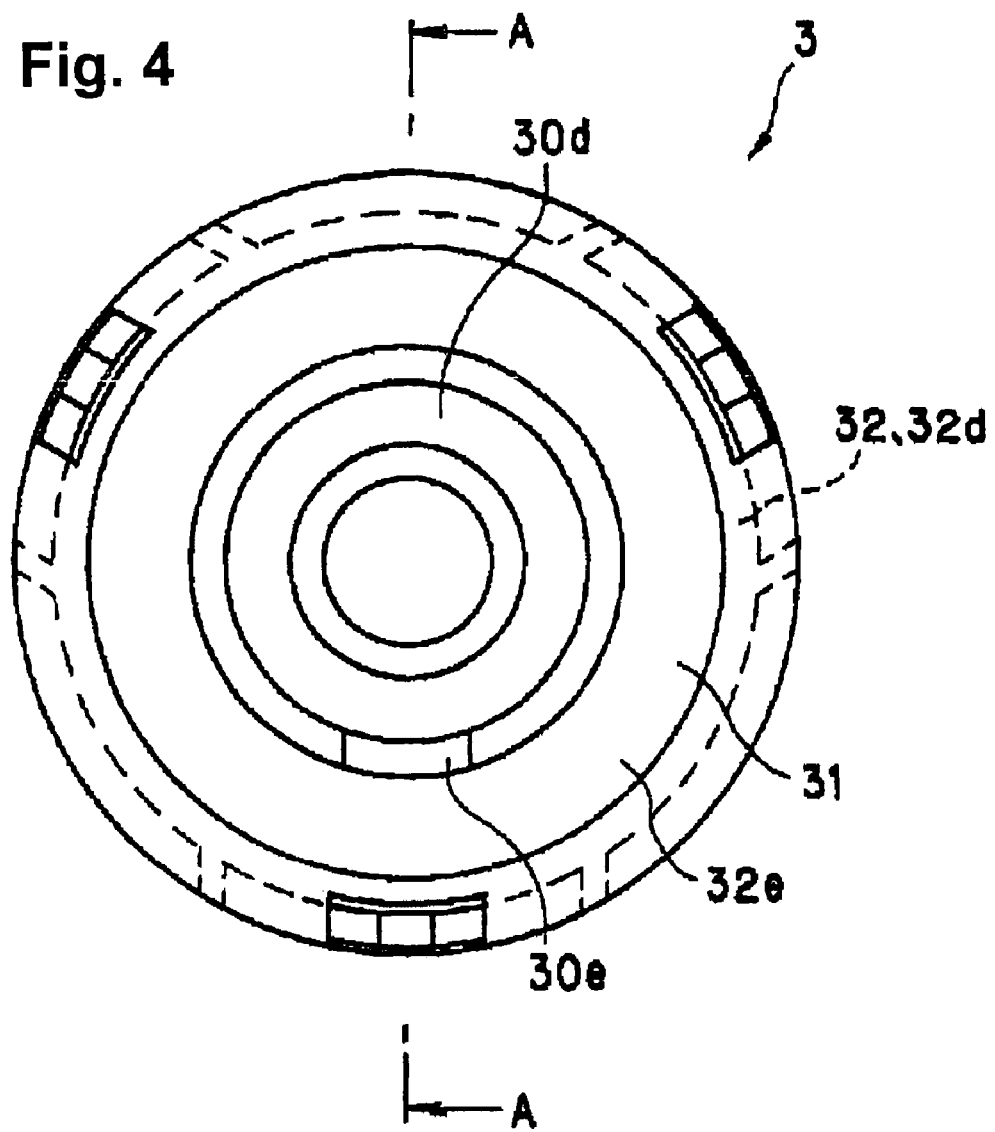
FIG. 4 shows a plan view of the braking device.
Figure 5:
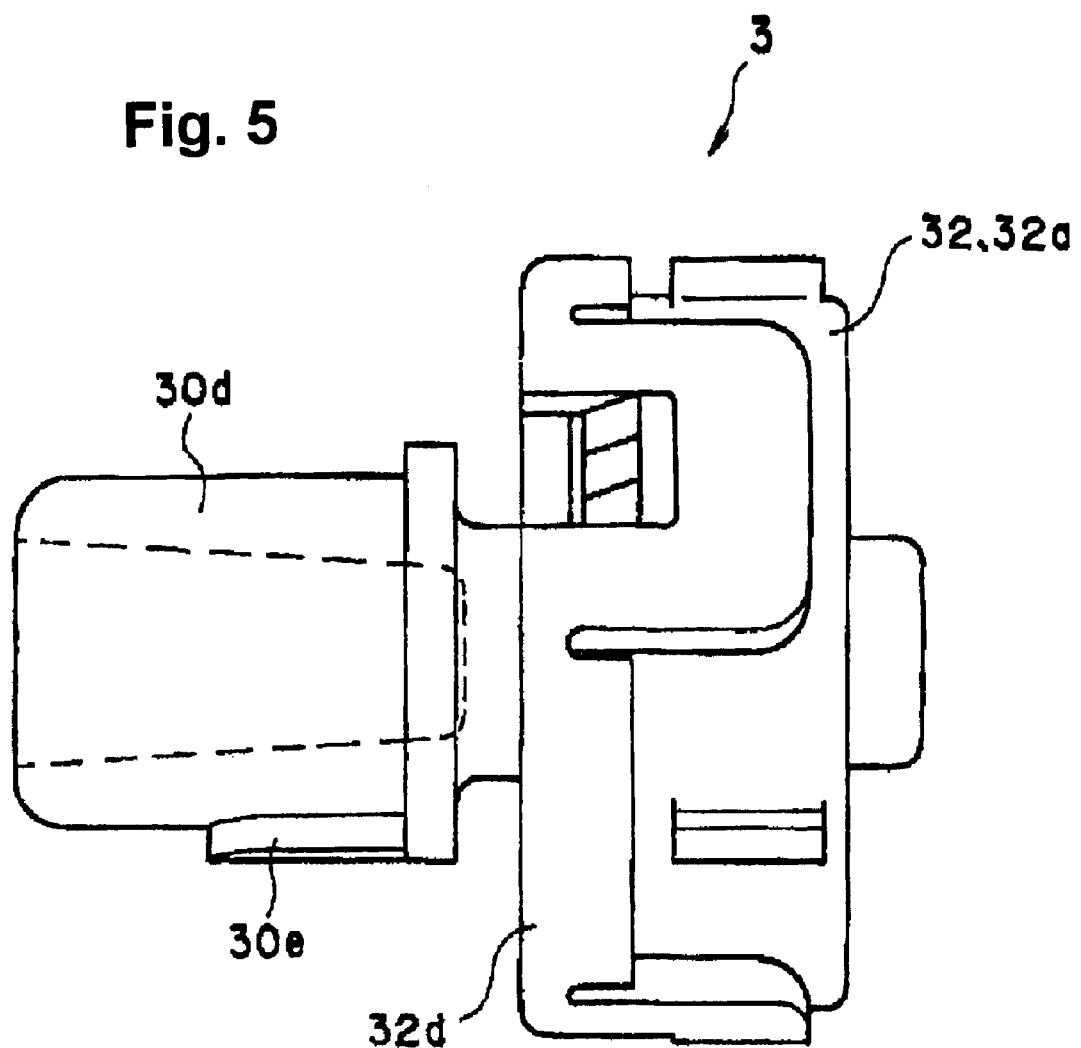
FIG. 5 shows a side view of the braking device.
Figure 6:
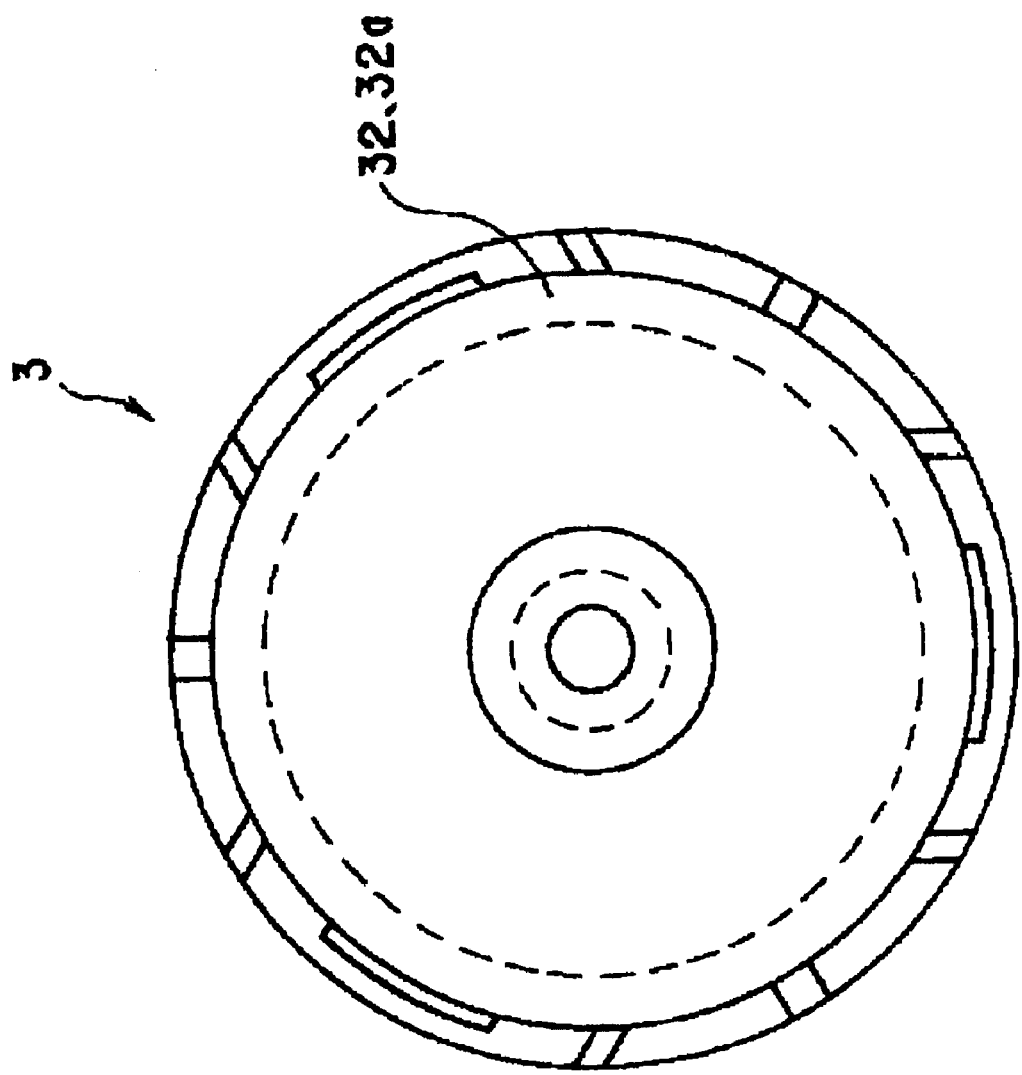
FIG. 6 shows a bottom view of the braking device.
Figure 8:
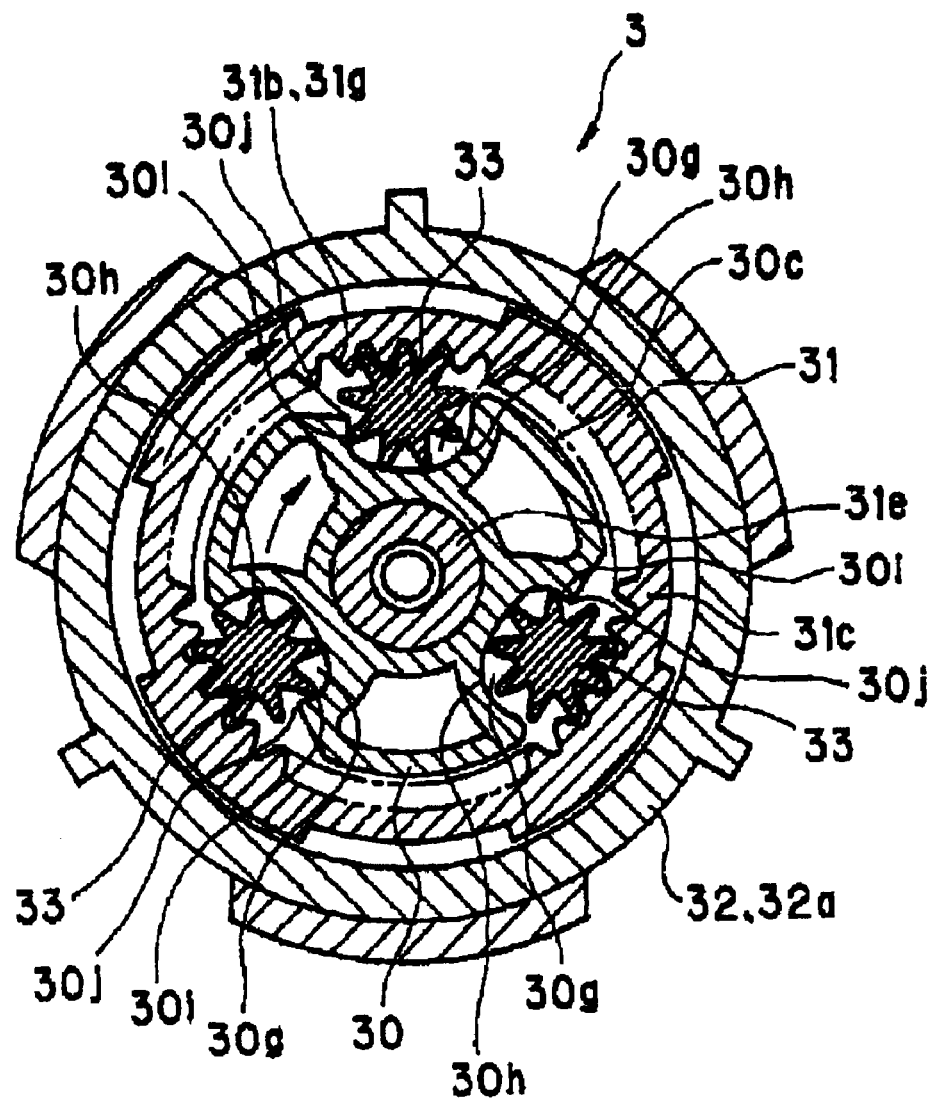
FIG. 8 shows a cross-sectional view taken along lines B—B in FIG. 7 (in rotations in a normal direction).
Figure 9:
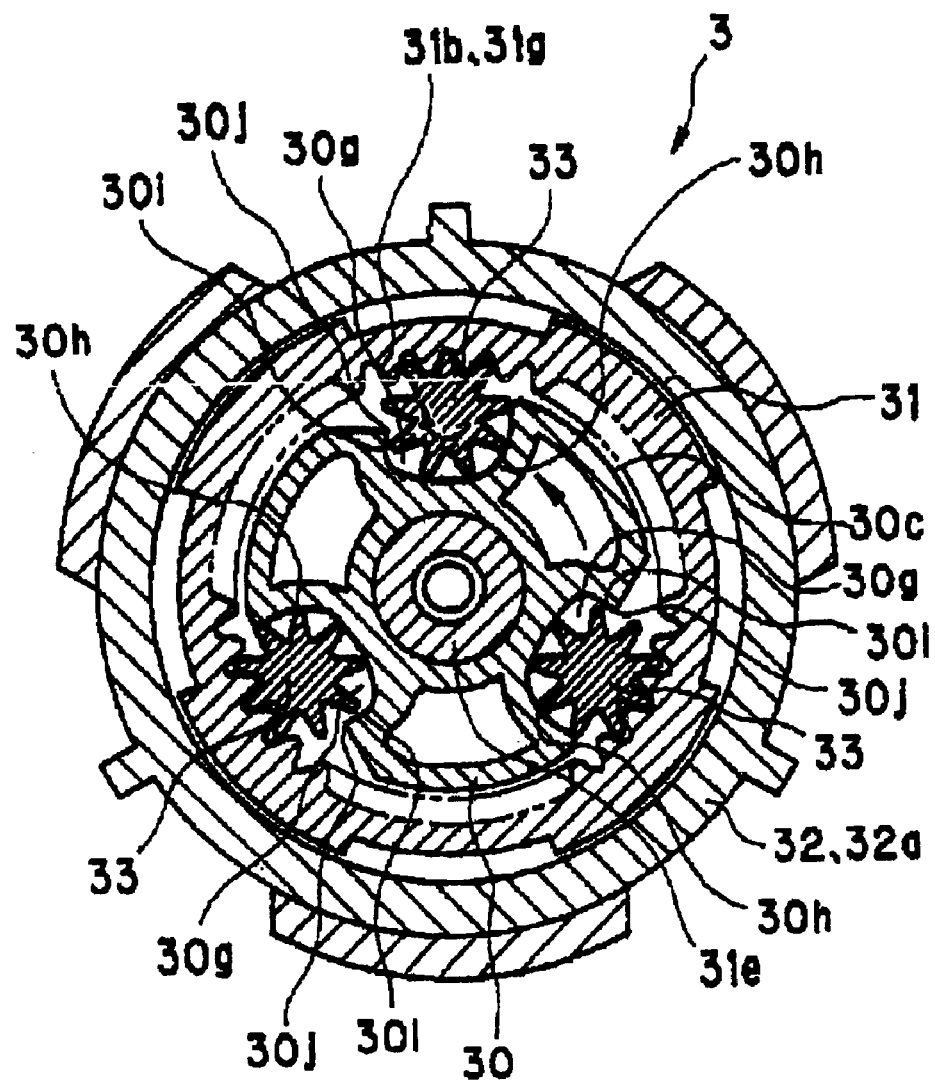
FIG. 9 shows a cross-sectional view taken along lines B—B in FIG. 7 (in rotations in a reverse direction).

FIG. 1 shows a perspective view of a winding mechanism, which is generally composed of a winding shaft 1, a force application device 2 and a braking device 3. It is noted that, in FIG. 1, components of the winding mechanism are shown separated from one another for easier understanding of the structure of the winding mechanism. FIG. 2 shows a cross section of the braking device 3 assembled in the winding mechanism, and FIG. 3 shows a cross section of the force application device 2 assembled in the winding mechanism. FIGS. 4 through 9 illustrate various aspects of the braking device 3. In particular, FIG. 8 shows an internal state of the braking device 3 when the winding shaft 1 is rotated in a normal direction, and FIG. 9 shows an internal state of the braking device 3 when the winding shaft 1 is rotated in a reverse direction that is opposite to the normal direction. It is noted that, in the descriptions below, rotation in the normal direction may also be referred to as "normal rotation," and rotation in the reverse direction as "reverse rotation."

The winding mechanism in accordance with the present embodiment retains a sheet material S in a wound state in which the sheet material S is wound around the winding shaft 1. The winding mechanism also allows the sheet material S to be pulled out from the wound state.

The sheet material S may be any one of a variety of sheet materials, for example, a sheet of one of woven materials, knitted materials, mesh materials, synthetic resin material and the like. Also, the sheet material S may typically be flexible.

The winding mechanism in accordance with the present embodiment may retain the sheet material S as a tonneau cover, a sun-shade, a blind or the like in a wound state, and allows the sheet material S to be pulled out from the wound state One end of the sheet material S is connected to the winding shaft 1. The sheet material S connected to the winding shaft 1 can be wound around the winding shaft 1 by rotation of the winding shaft 1 in a normal direction. When the other end of the sheet material S that is in a wound state is pulled manually, for example, the winding mechanism allows rotations of the winding shaft 1 in a reverse direction, and the reverse rotation of the winding shaft 1 allows the sheet material S to be unwound.

The force application device 2 always applies force to the winding shaft 1 in the normal direction f, as indicated in FIG. 1, in which the sheet material S is wound around the winding shaft 1. In other words, when the other end of the sheet material S, which may be pulled out and held by the user's hand as described above, or which may be temporarily fixed, is released, rotations of the winding shaft 1 are allowed, and the winding shaft 1 is automatically rotated in the normal direction, such that the sheet material S is wound around the winding shaft 1.

The sheet material S may include at its other end a hook device (not shown) that can be hooked to another hook device (not shown) that may be provided on a wall surface or the like that is located opposite the winding mechanism across a cargo space, for example. By joining the hook device on the sheet material S to the other hook device on the wall, the other end of the sheet material S can be temporarily retained at the wall. For example, when the sheet material S is used as a tonneau cover in a vehicle with a rear cargo space and a back door at a rear end of the cargo space, a hook device may be provided in the back door, and the hook device on the sheet material S can be engaged with the hook device on the back door. By so doing, the state in which the sheet material S is pulled out and covers the rear cargo space of the vehicle can be maintained. As the engagement of the hook devices is released, the sheet material S is wound as described above, and the state in which the rear cargo space is covered is readily released with a simple unhooking operation.

The braking device 3 is structured to apply braking force only to normal rotations of the winding shaft 1. In other words, the braking device 3 is structured not to apply positive braking force to reverse rotations of the winding shaft 1.

As a result, in a pull-out operation in which the sheet material S is pulled out, the winding shaft 1 can be rotated in the reverse direction without any positive resistance, and the pull-out operation can be smoothly conducted. On the other hand, when the grip or temporary fixed state at the other end of the sheet material S that is pulled out is released, and normal rotations of the winding shaft 1 are allowed, the winding mechanism automatically starts rotations of the winding shaft 1 in the normal direction, and winds the sheet material S on the winding shaft 1, thereby preventing various members composing the winding mechanism from severely colliding one another or being damaged. As a result, the sheet material S can be smoothly wound by the winding mechanism.

In one aspect of the present invention, the braking device 3 may be provided at each of the end sections of the winding shaft 1.

With the winding mechanism having the structure described above, braking force can be generated by the braking devices 3 at both of the end sections of the winding shaft 1 when the winding shaft 1 rotates in the normal direction. As a result, rotations of the winding shaft 1 in the normal direction can be stabilized, and therefore rotations of the winding shaft 1 in the normal direction can be more appropriately braked.

In the illustrated embodiment, the winding shaft 1 is formed from a hollow cylindrical member (e.g., a pipe member). The sheet material S has one end section that extends in its width direction; and the one end section of the sheet material S is attached to an outer circumferential section of the winding shaft 1 in a manner that the one end section of the sheet material S extends along an axial direction of the winding shaft 1.

In the illustrated embodiment, the winding shaft 1 is stored in a rotatable manner in an elongated main case 4 that is equipped with a slit 41 that extends in a length direction of the main case 4 through which the sheet material S can be pulled out.

Also, in the illustrated embodiment, one end of the winding shaft 1 is rotatably supported at one end section of the main case 4, and the other end of the winding shaft 1 is rotatably supported at the other end section of the main case 4 through a joint section 30d of an inner revolution member 30 to be described below that composes the braking device 3.

Also, in the illustrated embodiment shown in FIG. 3, the force application device 2 is formed from a coil spring 20 that is stored in the winding shaft 1. The coil spring 20 may be inserted through one end of the winding shaft 1. The main case 4 is provided with a shaft member 42 at its one end section to support one end of the winding shaft 1. The shaft member 42 extends into the interior of the winding shaft 1 from one end of the winding shaft 1. In the illustrated embodiment, one end 20a of the coil spring 20 is affixed to the shaft member 42, and the other end 20b of the coil spring 20 is affixed to one section of the winding shaft 1. When the winding shaft 1 is rotated in the reserve direction, the coil spring 20 is elastically reduced in its diameter, such that the force in the normal direction f applied to the winding shaft 1 is stored in the coil spring 20.

The braking device 3 in accordance with the present embodiment may be formed from an inner revolution member 30, an outer revolution member 31, a case member 32, a set of planetary gears 33, and a viscous fluid (its illustration is omitted from the drawings).

The inner revolution member 30 is affixed to the winding shaft 1 such that the inner revolution member 30 is rotated in unison with rotations of the winding shaft 1.

Figure 7:
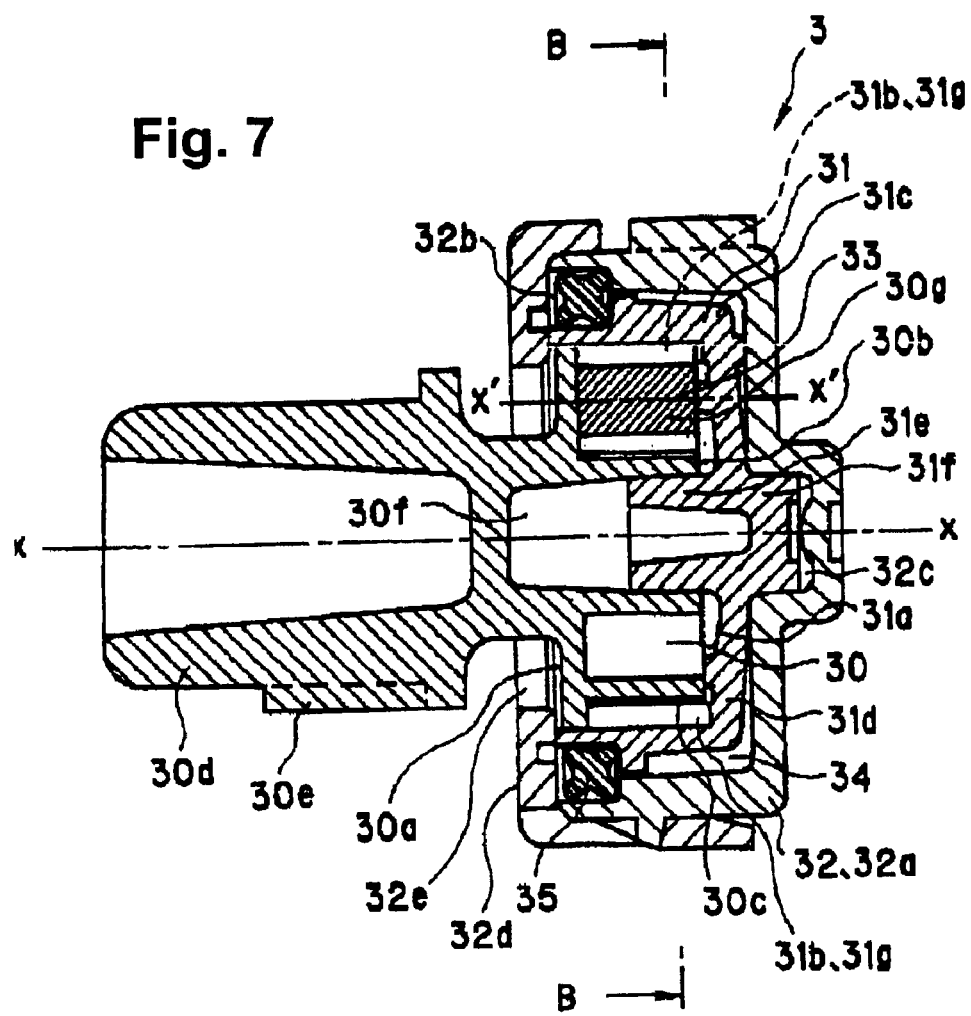
FIG. 7 shows a cross-sectional view taken along lines A—A in FIG. 4.

In the illustrated embodiment, as indicated in FIG. 7, the case member 32 is generally composed of a case base 32a with an opening section 32b that is open in its one surface, and a lid member 32d that generally covers an outer circumferential section of the opening section 32b of the case base 32a on the front side of the case base 32a and is equipped with a relatively large through hole 32e provided in a front face of the lid member 32d. The braking device 3 may be assembled as follows: the outer revolution member 31 is stored in the case base 32a, the inner revolution member 30 is stored inside the outer revolution member 31, and then the lid member 32d is coupled to the case base 32a in a manner that the lid member 32d covers the opening section 32b of the case base 32a. The assembled braking device 3 is inserted in a holder 43 that closes the other end section of the main case 4, and the holder 43 is affixed to the other end section of the main case 4 such that the assembled braking device 3 is affixed to the main case 4, as indicated in FIG. 2.

The inner revolution member 30 defines two faces 30a and 30b extending in a direction perpendicular to its rotation axis x, and a side surface 30c between the two faces 30a and 30b. The inner revolution member 30 is assembled such that one of the surfaces (hereafter referred to as a "front surface 30a") thereof opposes an inner surface of the lid member 32d, the other surface (hereafter referred to as a "rear surface 30b") thereof opposes a bottom surface 31a (to be described below) of the outer revolution member 31, and the side surface 30c thereof opposes an inner wall section 31b of the outer revolution member 31.

The inner revolution member 30 is formed in one piece with a joint section 30d that protrudes from the front surface 30a of the inner revolution member 30 in a direction along the rotation axis x of the inner revolution member 30. In the illustrated embodiment, the joint section 30d is structured in a cylindrical form with its one end being connected in one piece to the front surface 30a of the inner revolution member 30. The joint section 30d protrudes outwardly through the through hole 32e formed in the center of the lid member 32d. In the illustrated embodiment shown in FIG. 2, the joint section 30d is inserted through the other end of the winding shaft 1 into the winding shaft 1 such that the other end of the winding shaft 1 is pivotally supported by the other end of the main case 4 through the inner revolution member 30. In the illustrated embodiment, a positioning rib 30e extending in an axial line of the joint section 30d may be formed in an outer circumferential section of the joint section 30d, and a split groove 10 that extends in a rotation axis of the winding shaft 1 and is open outwardly may be formed on the winding shaft 1 on the other end thereof. The joint section 30d is inserted in the winding shaft 1 in a manner that the positioning rib 30e is inserted in the split groove 10, thereby connecting the winding shaft 1 to the inner revolution member 30 in one piece.

Also, the inner revolution member 30 is provided with a shaft hole 30f that recedes toward the front surface 30a of the inner revolution member 30, which is formed in the rear surface 30b of the inner revolution member 30 in a rotation center of the inner revolution member 30.

The outer revolution member 31 is rotatable within the case member 32 in a state in which the inner revolution member 30 is stored inside the outer revolution member 31. In the illustrated embodiment, the outer revolution member 31 includes a circumferential side wall section 31c and a bottom wall section 31d that oppose the inner surfaces of the case base 32a. The inner revolution member 30 can be stored in the outer revolution member 31 through an open side of the outer revolution member 31 that is opposite to the bottom wall section 31d. A shaft protruded section 31e is formed in a bottom surface 31a that is composed of the bottom wall section 31d of the outer revolution member 31 in a rotation center of the outer revolution member 31. In the illustrated embodiment, the inner revolution member 30 is stored inside the outer revolution member 31 in a state in which the shaft protruded section 31e is inserted in the shaft hole 30f of the inner revolution member 30, such that the inner revolution member 30 can rotate about the shaft protruded section 31e of the outer revolution member 31 as a center of rotation.

Also, in the illustrated embodiment, a shaft concave section 32c is formed generally in a center of a bottom section of the case base 32a, and a shaft convex section 31f is formed on the bottom wall section 31d of the outer revolution member 31 on an outer surface side of the bottom wall section 31d generally in a rotation center of the outer revolution member 31. The shaft convex section 31f enters the shaft concave section 32c as the outer revolution member 31 is stored in the case base 32a.

The inner revolution member 30 includes recessed concave sections 30g that recede toward the rotation center from the outer circumferential side of the inner revolution member 30. The planetary gears 33 are stored in the concave sections 30g of the inner revolution member 30, respectively.

Also, an arcuate rack section 31g, which engages the planetary gears 33, is provided on an inner wall section (an inner surface section of the circumferential side wall section 31c) of the outer revolution member 31.

When the inner revolution member 30 is rotated in the normal direction by rotations of the winding shaft 1 in the normal direction, rotations of the planetary gears 33 are restricted.

Further, a gap 34 is formed between the outer revolution member 31 and the case member 32, and the viscous fluid (not shown) is filled in the gap 34.

More specifically, in the illustrated embodiment, the gap 34 is formed between the outer surface of the bottom wall section 31d of the outer revolution member 31 and the bottom section of the case base 32a, and the viscous fluid such as silicon oil is filled in the gap 34. In the illustrated embodiment, a seal ring 35 is tightly attached to a top outer surface of the circumferential side wall section 31c of the outer revolution member 31 to seal the viscous fluid in the gap 34 to thereby prevent the viscous fluid from leaking through the opening section 32b of the case base 32a.

Also, in the illustrated embodiment, the concave sections 30g are formed at three locations in the inner revolution member 30. The three concave sections 30g are spaced generally at the same pitch in a direction in which the inner revolution member 30 rotates around the rotation shaft. Also, the three concave sections 30g are structured to have generally the same size and same shape.

Each of the concave sections 30g is open outwardly on the side of the side surface of the inner revolution member 30, and on the side of the front surface 30a and the rear surface of the inner revolution member 30.

Also, each of the concave sections 30g includes a wall surface that pushes the planetary gear 33 that is stored in the recessed section 30g when the inner revolution member 30 is rotated in the reverse direction. The wall surface of the concave section 30g is defined by an arcuate surface 30h that extends along an arc of a peripheral circle of the planetary gear 33, in other words, an arc of a virtual circle passing the tips of gear teeth of the planetary gear 33.

Also, each of the concave sections 30g includes another wall surface that pushes the planetary gear 33 that is stored in the recessed section 30g when the inner revolution member 30 is rotated in the normal direction. The other wall surface of the concave section 30g is defined by a straight surface 30i that generally extends along a tangential line with respect to the peripheral circle of the planetary gear 33, and along a virtual straight line passing the rotation center of the planetary gear 33 and the rotation center of the inner revolution member 30. A corner section 30j is formed between the straight surface 30i and the outer circumferential surface of the inner revolution member 30. The straight surface 30i of the concave section 30g is pushed against the planetary gear 33 in normal rotations, and moves slightly inside the peripheral circle of the planetary gear 33.

In other words, the pitch between the arcuate surface 30h and the straight surface 30i of the concave section 30g is slightly wider than the diameter of the peripheral circle of the planetary gear 33, and the planetary gear 33 is not axially supported by either of the inner revolution member 30 or the outer revolution member 31.

The planetary gears 33 stored in the three concave sections 30g are formed to have generally the same size and shape. Also, each of the planetary gears 33 is stored in each of the corresponding concave sections 30g of the inner revolution member 30 in a manner that the rotation axis x' of the planetary gear 33 extends generally along the rotation axis x of the inner revolution member 30.

Further, the pitch between the bottom of the concave section 30g of the inner revolution member 30 and the inner wall section of the outer revolution member 31 is generally the same as the diameter of the planetary gear 33.

As a result, in accordance with the present embodiment, when the winding shaft 1 is rotated in the reverse direction, as indicated in FIG. 9, the inner revolution member 30 that is rotatable inside the outer revolution member 31 is rotated in the reverse direction due to the reverse rotation of the winding shaft 1. In rotation in the reverse direction, the inner revolution member 30 pushes the planetary gears 33 and allows the planetary gears 33 to rotate and run along the arcuate rack section 31g of the outer revolution member 31 such that the outer revolution member 31 is not rotated by the rotation of the inner revolution member 30. Since the viscous fluid is filled in the gap 34 between the outer revolution member 31 and the case member 32 and the outer revolution member 31 does not rotate, the viscous fluid does not brake rotations of the inner revolution member 30 in the reverse direction, and therefore does not brake rotations of the winding shaft 1 in the reverse direction. In other words, the winding mechanism of the present invention can securely create a state in which no resistance is generated against an operation of pulling out the sheet material S.

More specifically, when the inner revolution member 30 is rotated in the reverse direction, the inner revolution member 30 causes the arcuate surfaces 30h of the concave sections 30g to push against the planetary gears 33. Since the arcuate surface 30h is defined by a surface that extends along the peripheral circle of each of the planetary gears 33, the arcuate surface 30h being pushed against the planetary gear 33 does not prevent the planetary gear 33 from rotating, such that the planetary gears 33 rotate and run along the circumferential rack section 31g, and does not rotate the circumferential rack section 31g, in other words, the outer revolution member 31.

On the other hand, when the winding shaft 1 rotates in the normal direction, as indicated in FIG. 8, the inner revolution member 30 that is rotatable inside the outer revolution member 31 is rotated by the outer revolution member 31 in the normal direction. In rotations in the normal direction, the inner revolution member 30 pushes the planetary gears 33 and restricts rotations of the planetary gears 33. When the rotation of the planetary gears 33 is restricted, the outer revolution member 31 can also be rotated by the rotation of the inner revolution member 30 in the normal direction through the planetary gears 33 that engage the arcuate rack section 31g of the outer revolution member 31. When the outer revolution member 31 is rotated, the viscous fluid brakes rotations of the inner revolution member 30 in the normal direction within the outer revolution member 31, and therefore brake rotations of the winding shaft 1 in the normal direction. In other words, the winding mechanism of the present invention can securely create a state in which resistance is generated against an automatic winding operation of the force application device 2 that automatically winds the sheet material S that has been pulled out.

More specifically, when the inner revolution member 30 is rotated in the normal direction, the inner revolution member 30 causes the straight surfaces 30i of the concave sections 30g to push against the planetary gears 33, and the corner sections 30j between the straight surfaces 30i and the outer circumferential surface of the inner revolution member 30, in other words, the corner sections 30j adjacent to mouth sections of the concave sections 30g, to move into spaces between adjacent gear teeth of the planetary gears 33. As the straight surfaces 30i are pushed against the planetary gears 33, and the planetary gears 33 are stopped by the corner sections 30j, the outer revolution member 31, whose circumferential rack section 31g engage the planetary gears 33, is rotated in the same direction as the inner revolution member 30.

With the winding mechanism for winding a sheet material in accordance with the present invention described above, an appropriate braking force can be applied to the winding shaft when the sheet material is wound; and no braking force is applied in a pull-out operation in which the sheet material is pulled out, such that the sheet material can be pulled out without any resistance.

While the description above refers to a particular embodiment of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A winding mechanism comprising:
   a sheet material;
   a winding shaft attached to one end of the sheet material;
   a force application device that always applies a force to the winding shaft in a normal direction in which the sheet material is wound around the winding shaft; and
   a braking device that applies a braking force to the winding shaft only in the normal direction, wherein the braking device comprises:
      an inner revolution member that is attached to the winding shaft and rotatable in unison with rotations of the winding shaft, the inner revolution member including concave sections that recede toward a center rotation;
      an outer revolution member that is rotatable and generally encircles the inner revolution member, the outer revolution member defining an inner wall section that is provided with an arcuate rack section;
      planetary gear members that are stored in the concave sections of the inner revolution member and engage the arcuate rack section;
      a case member that stores the outer revolution member; and
      a viscous fluid that fills a gap formed between the outer revolution member and the case member, wherein rotations of the planetary gears are restricted when the inner revolution member is rotated in the normal direction by rotations of the winding shaft in the normal direction.

2. A winding mechanism according to claim 1, wherein the inner revolution member includes a corner section that stops rotations of the planetary gears when the inner revolution member is rotated in the normal direction by rotations of the winding shaft in the normal direction.

3. A winding mechanism according to claim 2, wherein the corner section is formed between each of the concave sections and an outer circumferential surface of the inner revolution member.

4. A winding mechanism according to claim 2, wherein the corner section does not restrict rotations of the planetary gears when the inner revolution member is rotated in a reverse direction in which the sheet material wound is unwound.

5. A winding mechanism according to claim 1, wherein each of the concave sections formed in the inner revolution member includes an arcuate curved surface, a straight surface section and a corner section between the arcuate curved surface and the straight surface section, wherein the straight surface section pushes each of the planetary gears and the corner section stops rotations of each of the planetary gears when the inner revolution member is rotated in the normal direction by rotations of the winding shaft in the normal direction.

6. A winding mechanism according to claim 5, wherein the outer revolution member and the inner revolution member rotate in unison in the normal direction when the winding shaft is rotated in the normal direction.

7. A winding mechanism according to claim 6, wherein the viscous fluid brakes rotations in the normal direction of the outer revolution member and the inner revolution member when the outer revolution member is rotated.

8. A winding mechanism according to claim 5, wherein the arcuate curved surface pushes each of the planetary gears and the corner section does not restrict rotations of the planetary gears when the inner revolution member is rotated in a reverse direction in which the sheet material wound is unwound.

9. A braking device for a winding mechanism that winds a sheet material around a winding shaft, the braking device comprising:
   an inner revolution member that is connectable to the winding shaft and includes concave sections that recede toward a center of rotation;
   an outer revolution member that is rotatable and generally encircles the inner revolution member, the outer revolution member defining an inner wall section that is provided with an arcuate rack section;
   planetary gear members that are stored in the concave sections of the inner revolution member and engage the arcuate rack section;
   a case member that stores the outer revolution member; and
   a viscous fluid that fills a gap formed between the outer revolution member and the case member, wherein rotations of the planetary gears are restricted only when the inner revolution member is rotated in a normal direction in which the sheet material is wound around the winding shaft.

10. A braking device according to claim 9, wherein the inner revolution member includes a corner section that stops rotations of the planetary gears when the inner revolution member is rotated in the normal direction by rotations of the winding shaft in the normal direction.

11. A braking device according to claim 10, wherein the corner section is formed between each of the concave sections and an outer circumferential surface of the inner revolution member.

12. A braking device according to claim 10, wherein the corner section does not restrict rotations of the planetary gears when the inner revolution member is rotated in a reverse direction in which the sheet material wound is unwound.

13. A braking device according to claim 9, wherein each of the concave sections formed in the inner revolution member includes an arcuate curved surface, a straight surface section and a corner section between the arcuate curved surface and the straight surface section, wherein the straight surface section pushes each of the planetary gears and the corner section stops rotations of each of the planetary gears when the inner revolution member is rotated in the normal direction.

14. A braking device according to claim 13, wherein the outer revolution member and the inner revolution member rotate in unison in the normal direction.

15. A braking device according to claim 14, wherein the viscous fluid brakes rotations in the normal direction of the outer revolution member and the inner revolution member.

16. A braking device according to claim 13, wherein the arcuate curved surface pushes each of the planetary gears and the corner section does not restrict rotations of the planetary gears when the inner revolution member is rotated in a reverse direction in which the sheet material wound is unwound.

17. A winding mechanism comprising:

a cylindrical winding shaft;

a sheet material attached to the winding shaft;

a force application device that is provided at one end of the winding shaft and always applies a force to the winding shaft in a normal direction in which the sheet material is wound around the winding shaft; and a braking device that is provided at another end of the winding shaft and applies a braking force to the winding shaft only in the normal direction, wherein the braking device comprises: an inner revolution member having a protruded section that is inserted in and affixed to the cylindrical winding shaft, the inner revolution member being rotatable in unison with rotations of the winding shaft, and including concave sections that recede toward a center of rotation; an outer revolution member that is rotatable and generally encircles the inner revolution member, the outer revolution member defining an inner wall section that is provided with an arcuate rack section; planetary gear members that are stored in the concave sections of the inner revolution member and engage the arcuate rack section; a case member that stores the outer revolution member; and a viscous fluid that fills a gap formed between the outer revolution member and the case member, wherein rotations of the planetary gears are restricted when the inner revolution member is rotated in the normal direction by rotations of the winding shaft in the normal direction.

18. A winding mechanism according to claim 17, wherein the inner revolution member includes a corner section that stops rotations of the planetary gears when the inner revolution member is rotated in the normal direction by the winding shaft rotating in the normal direction.

19. A winding mechanism according to claim 18, wherein the corner section is formed between each of the concave sections and an outer circumferential surface of the inner revolution member.

20. A winding mechanism according to claim 18, wherein the corner section does not restrict rotations of the planetary gears when the inner revolution member rotates in a reverse direction in which the sheet material wound is unwound.

21. A winding mechanism according to claim 17, wherein each of the concave sections formed in the inner revolution member includes an arcuate curved surface, a straight surface section and a corner section between the arcuate curved surface and the straight surface section, wherein the straight surface section pushes each of the planetary gears and the corner section stops rotations of each of the planetary gears when the inner revolution member rotates in the normal direction.

22. A winding mechanism according to claim 21, wherein the outer revolution member and the inner revolution member rotate in unison in the normal direction.

23. A winding mechanism according to claim 22, wherein the viscous fluid brakes rotations in the normal direction of the outer revolution member, the inner revolution member and the winding shaft.

24. A winding mechanism according to claim 21, wherein the arcuate curved surface pushes each of the planetary gears and the corner section does not restrict rotations of the planetary gears when the inner revolution member rotates in a reverse direction in which the sheet material wound is unwound.

* * * * *